May 29, 1962    H. B. BURT ETAL    3,036,533
METHOD AND APPARATUS FOR COATING FOOD ARTICLES
Filed Jan. 8, 1959    5 Sheets-Sheet 1

INVENTORS:
HARRY B. BURT, JR.
PAUL E. WALTER
BY
Kegan, Bellamy & Kegan
ATTORNEYS May 29, 1962 H. B. BURT ETAL 3,036,533
METHOD AND APPARATUS FOR COATING FOOD ARTICLES
Filed Jan. 8, 1959 5 Sheets-Sheet 2

INVENTORS:
HARRY B. BURT, JR.
PAUL E. WALTER
BY
Kegan, Bellamy & Kegan
ATTORNEYS

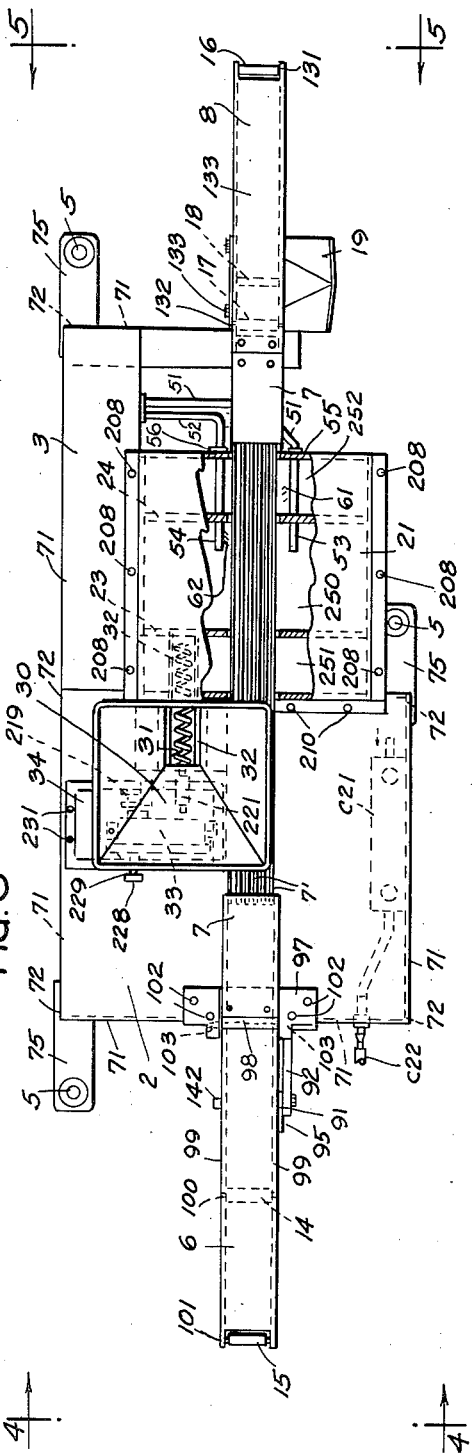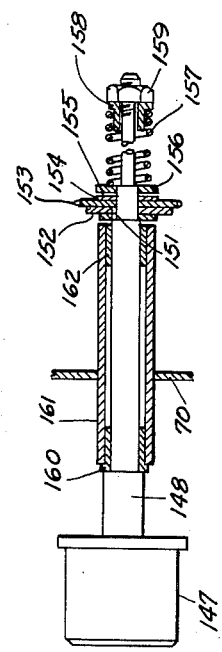

May 29, 1962   H. B. BURT ETAL   3,036,533
METHOD AND APPARATUS FOR COATING FOOD ARTICLES
Filed Jan. 8, 1959   5 Sheets-Sheet 4

INVENTORS:
HARRY B. BURT, JR.
PAUL E. WALTER
BY
Kegan, Bellamy & Kegan
ATTORNEYS May 29, 1962   H. B. BURT ETAL   3,036,533
METHOD AND APPARATUS FOR COATING FOOD ARTICLES
Filed Jan. 8, 1959   5 Sheets-Sheet 5
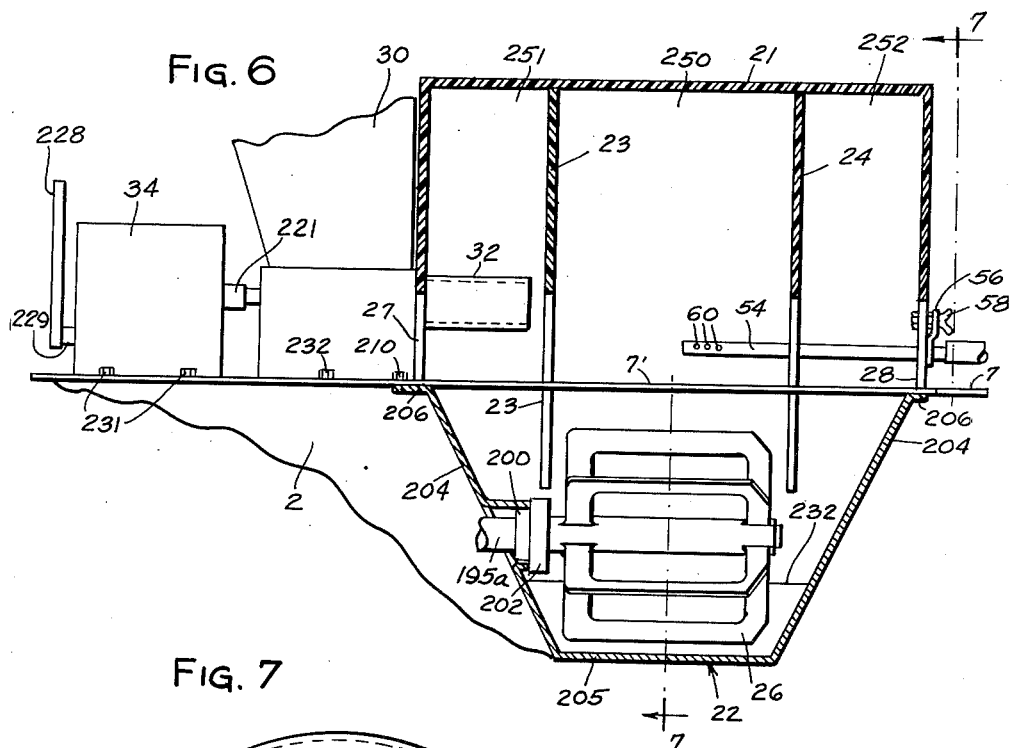
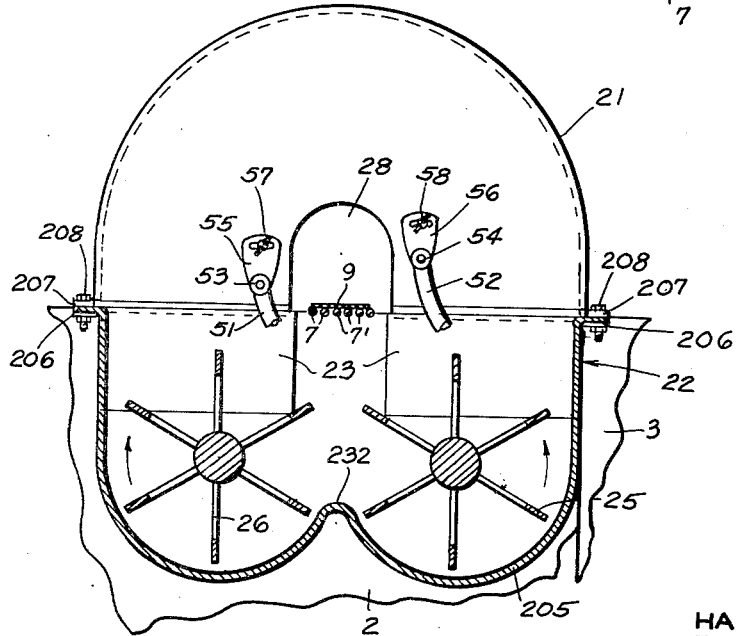
INVENTORS:
HARRY B. BURT, JR.
PAUL E. WALTER
BY
Kegan, Bellamy & Kegan
ATTORNEYS 3,036,533
METHOD AND APPARATUS FOR COATING
FOOD ARTICLES
Harry B. Burt and Paul E. Walter, Tulsa, Okla., assignors to Malt-A-Plenty, Inc., Tulsa, Okla., a corporation of Delaware
Filed Jan. 8, 1959, Ser. No. 785,664
9 Claims. (Cl. 107—54)

Our invention relates to the coating of food articles. Its principal object is to provide a new and improved method or process and new and improved apparatus for successfully and commercially applying an edible coating to articles of food, as to improve their flavor or appearance, or both.

The new method and apparatus are of particular utility in applying a coating of solid or semi-solid particles to food articles having a soft or tacky exterior in which the coating particles may become partly imbedded, but the principles of the invention may be applicable to the coating of food articles generally by applying thereto coating particles, such as liquid or semi-liquid droplets, capable of adhering to a non-tacky surface.

This application is a continuation-in-part of our United States application, Serial No. 616,533, filed October 17, 1956, for Confection Coating Apparatus, now abandoned.

For the most part, tacky-surfaced food articles such as taffy covered apples and serving portions of frozen dessert, such as ice cream and the like, have been coated with chopped nutmeats, candy particles, and the like, by rolling or tumbling the articles in the coating material or by laborious hand-sprinkling operations. These prior methods are open to the objection that the applied coating is not readily controllable as to the quantity applied and as to uniformity from article to article, and to the further objection that some articles to be coated, such as relatively soft ball-like molded ice cream portions, cannot ordinarily withstand the tumbling or rolling required to coat them by the known methods and apparatus.

According to the invention, the coating operation is performed within a suitable chamber into and from which the articles to be coated can be placed and removed, preferably while being continuously supported on a suitable movable-support member. While any such article is so supported within the coating chamber, the coating material is thrown or driven from a variety of directions into adhering contact with the supported article to coat all of the exposed surface thereof generally uniformly and to the extent desired, following which the coated article is removed from the coating chamber.

A feature of the disclosed invention is that the coating particles are at least partially entrained in turbulent and conflicting currents of air which are caused to flow within the coating chamber to assist randomizing the directions of movement of the coating particles toward the article to be coated. Conveniently, the desired turbulent movement of the coating particles within the coating chamber, where such particles are of the nature of chopped nutmeats or small candies, for example, may be obtained by employing one or more blowing and impelling devices, preferably located below the location of the articles to be coated, which serve both to directly impel the coating particles and to create the desired accompanying turbulent air flow.

In the illustrated preferred embodiment of the apparatus, a continuous conveyor is employed for conveying the articles successively through the coating chamber, and the upper surface of the coating chamber has an arcuate form, with two blower-impellers being employed to direct air movement and coating-particle movement upwardly along opposite sides to meet along the center plane of the coating chamber to thus create the noted turbulence and generally randomized direction of particle movement by interaction of opposed main streams of air and particles. The blower-impellers are preferably of the rotary vane type having widely spaced vanes providing a repetitive pulsating character to the movement of the air and particles. The preferred construction is such that the impelled coating particles which do not impinge upon and adhere to an article being coated are returned, by air currents and gravity, to the blower-impeller apparatus to start another journey.

According to further features, the conveyor movement is along the longitudinal axis of the coating chamber, above the blower-impellers, and the chamber is provided with limited entrance and egress openings, to limit the loss of freely flying coating material from the chamber.

According to a related feature, loss of freely flying coating material is further reduced by providing the coating chamber with crosswise partitions having openings aligned with the entrance and egress openings, to thus provide entrance and egress coating-chamber sections from which the noted turbulent-air and coating-particle movements are largely absent. Consequently, the coating particles entering the noted entrance and egress portions of the coating chamber and trapped therein are permitted to fall by gravity, and to be carried by return air currents, to again come under the influence of the action of the blower-impeller apparatus.

According to a further feature, air under substantial pressure is led into the coating chamber and is discharged in small streams of relatively high velocity to assist in the noted turbulent direction-randomizing action of the coating particles and also to blow from the conveyor, and thus reclaim within the coating chamber, those particles of coating material which alight upon the conveyor.

According to further features, structure is provided for use during the continuous coating operation to supply a continuous replenishing flow of coating material into the coating chamber at an adjustable rate depending upon the thickness of coating desired.

An additional feature is that the noted conveyor structure may be employed in connection with a forming machine, which forms a succession of serving portions of ice cream and the like, to convey those serving portions to a grouping and packaging location whereat the articles may be received as coated articles, or received as uncoated articles, as desired, depending upon whether the noted coating-chamber apparatus is in operation or is maintained quiescent.

The above-mentioned and other objects and features of this invention and the manner of attaining them will become more apparent, and the invention itself will be best understood, by reference to the following description of an embodiment of the invention taken in conjunction with the accompanying drawings, comprising FIGS. 1 to 8, wherein:

FIG. 1, partly in perspective, shows a coater C embodying the invention together with a former F which supplies a succession of articles to be processed by the coater C;

FIG. 3 is a top view of the structure of FIG. 2;

Figure 2:
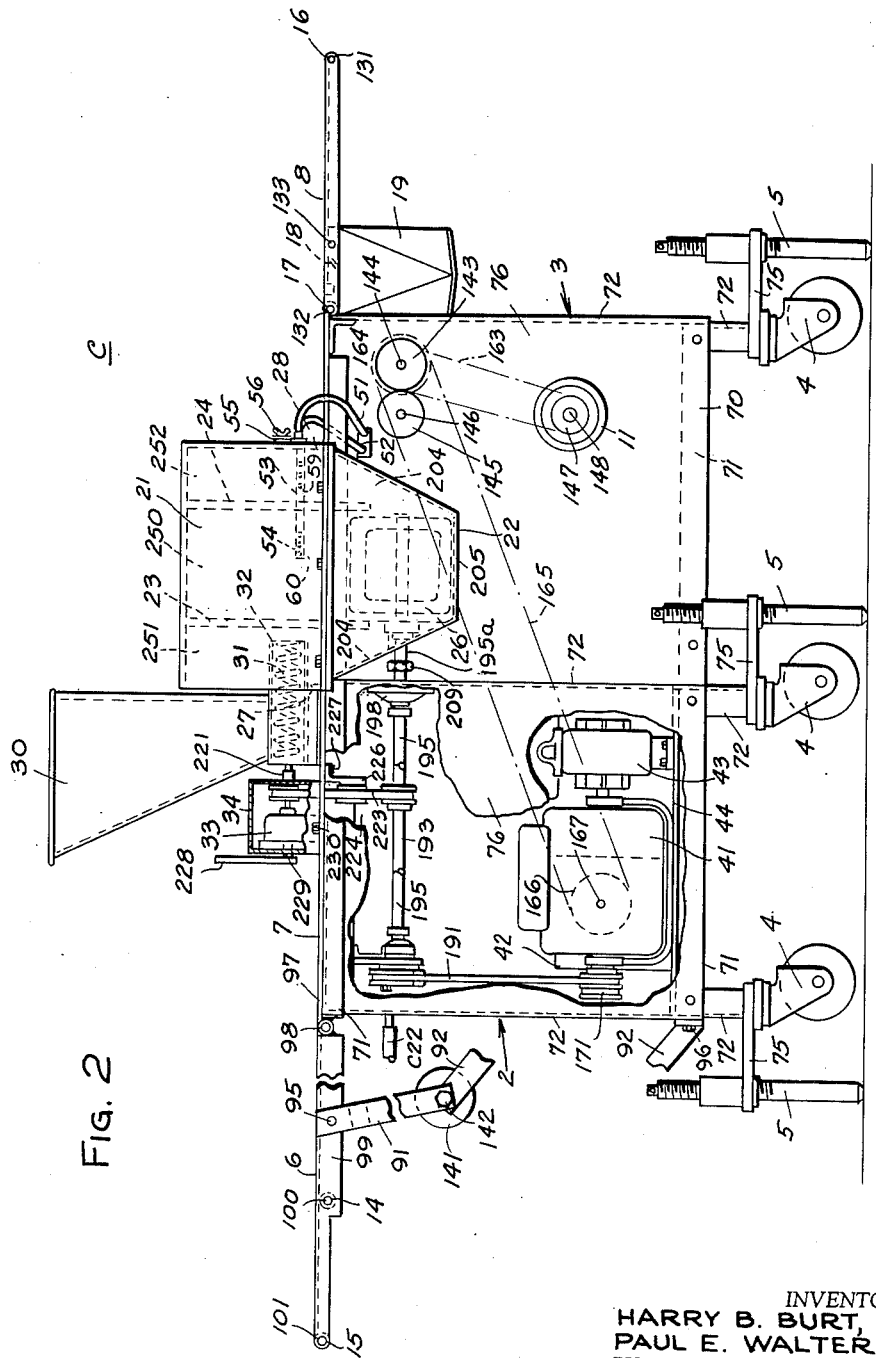
FIG. 2 shows the coater C of FIG. 1 in side view and more in detail.
Figure 4:
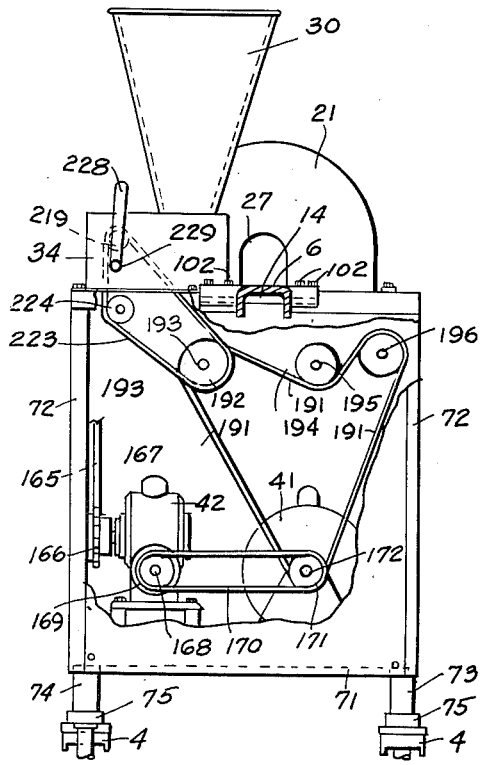
Figure 5:
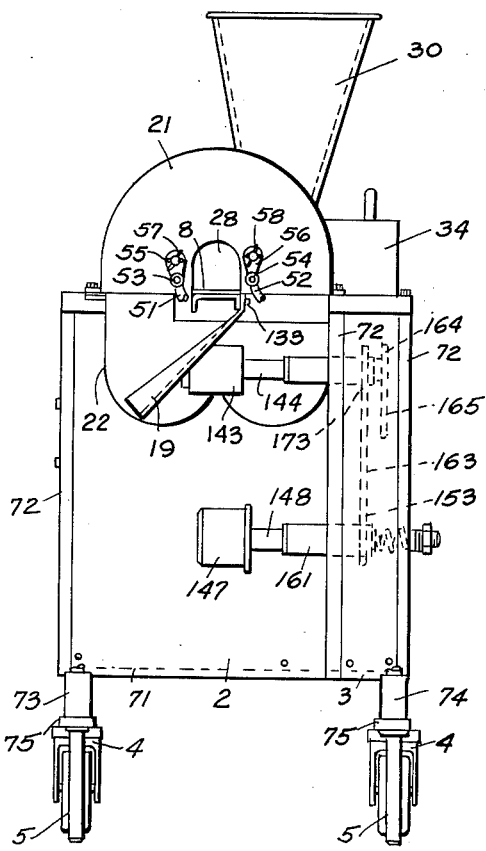

FIGS. 4 and 5 are front-end and rear-end views taken along lines 4—4 and 5—5 of FIG. 3;

FIG. 6 is an enlarged side view, partly in section, of a part of the structure as seen in FIG. 2;

FIG. 7 is an end view, partly in section, taken along irregular line 7—7 of FIG. 6; and FIG. 8 shows a detailed view, partly in section, of take-up structure for the web portion of the conveyor of coater C.

Figure 1:
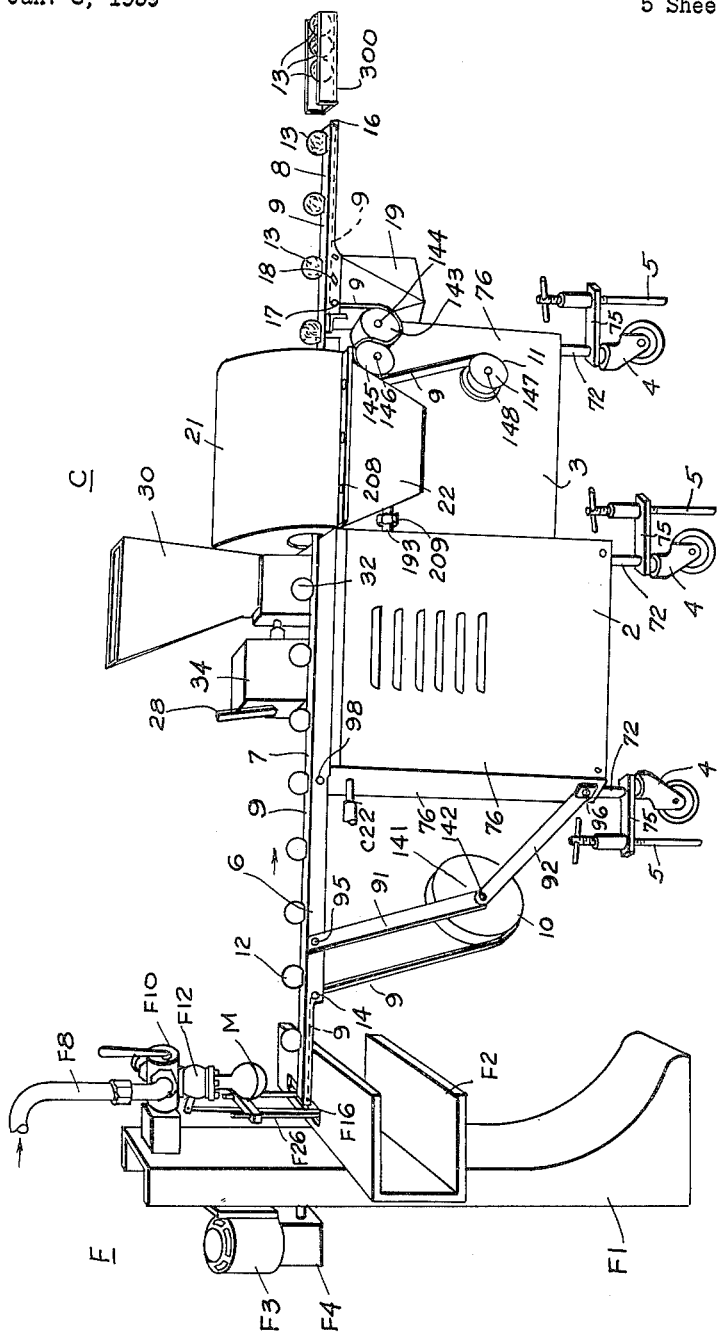

Referring in FIG. 1, the former F may be as disclosed in detail in our application for serving-portion producing apparatus filed currently herewith. It is the source of supply for the molded generally spherical articles 12 of ice cream or other frozen dessert handled by coater C. Former F comprises apparatus mounted on standard F1 for receiving the bulk product through supply pipe F8 and discharging it intermittently by way of valves F10 and F12 into a sectional mold M. Mold M and valve F12 are driven in timed sequence by motor F3 through gear box F4 and suitable shafting and cams (not shown). The Former includes the double shelf F2, above the top surface of which the recurring portion 9 of the conveyor apparatus of coater C is placed to receive the articles 12 as they are discharged in succession, in ball form, from the mold M, at a rate of forty articles per minute, for example. The molded articles as dropped in succession onto the conveyor of the coater are in a mildy frozen state (as in the neighborhood of 22° F. for ordinary ice cream). In that state, the articles become slightly flattened on the bottom on striking the conveyor, but they otherwise hold their shape and present a relatively soft or tacky surface during their travel through the coating chamber 21, 22, whereby solid or semi-solid coating particles may adhere thereto quite readily when driven at relatively low velocities.

Referring to FIGS. 1 to 5, the coater C has the general form of a cabinet-like structure of a generally L-shaped horizontal cross-section, as may be seen best in FIG. 3. It comprises the larger generally cubical cabinet section 2, and a cabinet section 3 of a smaller thickness dimension and having a common back wall with section 2. The coating structure is supported at three points as on the downward extension of three of the structural upright angle members 72, each of which terminates in a caster 4 for mobility, associated with which are three leveling devices 5 which may be used to raise the casters 4 from the floor surface and maintain the structure stationary in its desired operating location.

Cabinet portions 2 and 3 may be of the usual frame construction, including vertical angle members 72 and horizontal angle members 71 along the top and bottom enclosed by panels 76 which may be removable as desired for inspection and servicing purposes.

As shown best in FIGS. 1 to 3, the cabinet structure is surmounted by a conveyor which comprises a receiving section 6, and intermediate section 7, and a discharge section 8, the intermediate section leading through coating chamber 21, 22. The active portion of the conveyor is a web 9 which is moved along the conveyor from left to right, as seen in FIGS. 1 to 3, from supply roll 10 to take-up roll 11. From the supply roll 10, the web 9 (which may be a ribbon of sterile wax paper of a suitable width) is passed over rollers 14 and 15 (FIGS. 2 and 3), supported at bearing points 100 and 101, and thence traverses the length of the conveyor run.

At the discharge end of the conveyor, the conveyor web 9 is passed downwardly and to the left around roller 16 (journaled at 131) following which it passes over roller 17, and then travels downwardly and upwardly between drive roller 143 (having shaft 144) and idler roller 145 (having shaft 146), and thence to the driven take-up roll 11, on roller 147 having a slipping-clutch driving arrangement shown in FIG. 8. The pulling action of drive roller 143, against which idler roller 145 makes a continuous snug fit, pulls the paper over the surface of the conveyor track and off the supply roll 10, with its usual core 141 supported on axle 142 carried by bracket member 91 connected at 95 with member 6 and at 96 to the cabinet structure.

For handling articles 12 at the rate of about 40 per minute, the conveyor web 9 may be moved at about 27 feet per minute, giving a spacing of the articles 12 along the conveyor of some inches apart.

While the web 9 of the conveyor could be supplied as a continuous belt, the difficulty in completely sterilizing such a belt at intervals to insure sanitation renders the disclosed throw-away type of conveyor web more feasible economically under current supply conditions with respect to sterile rolls 10. When the roll 10 is exhausted, a new roll is applied and fed through the apparatus. By that time the take-up roll 11 has become large and it is removed and discarded. To avoid undesired bulk in the take-up roll, as when particles of the articles being handled adhere to the web 9 after removal of these articles from the discharge end of the conveyor, a scraper blade 18 (FIGS. 1 to 3) is provided which makes light contact with the underside of the returning web 9 and thus scrapes the web relatively clean. The material scraped from the web drops on the inclined chute 19, from which it may be collected at intervals, or may be allowed to fall from 19 into a suitable container, not shown.

When the hereinafter described apparatus of coating chamber 21, 22 is in operation, the objects 12 carried through the coating chamber emerge as coated objects 13 at the discharge end of the conveyor. The conveyed articles, whether coated or uncoated, may be collected, as in groups of four, at the discharge end of the conveyor, in pre-packaged form. The pre-packaged groups may then be deeply frozen to promote handling rigidity, following which the pre-packaged groups may be placed into final packages for shipment.

Pre-packaging unit 300 in shown in FIG. 1 with three coated articles 13 therein and awaiting the delivery thereto of the fourth coated article 13. This unit, or package filler, may be a trough-like open-ended structure formed by bending up side portions of a flat sheet of treated paper board, along scored lines. In practice, the pre-packaging operator holds item 300 with the side portions inclined outwardly and with the item tipped downwardly and pushed forwardly to cause the first-received coated article to reach the end position, where the article may be stopped by a slight side pressure at that point, the procedure being modified as needed to allow the remaining three coated articles to be received within trough 300 until that pre-packaged unit is filled, following which the filled one is set aside for the hardening freeze and an empty one is used for the next group of coated articles. When the foregoing technique is followed, the coated articles rest during the conveying, coating, and pre-packaging operations on the same side on which they were dropped from the former, and may continue to rest on the same side in the final packaging. Accordingly, the entire process of handling, coating, and packaging may be carried out without any rolling or tumbling of the serving-portion articles.

When a portion of the article production at former F is to be supplied uncoated, it suffices merely to permit the hereinafter described coating-control apparatus within and associated with coating chamber 21, 22 to be quiescent, in which case the articles 12 reach the discharge end of the conveyor as uncoated articles, comprising predetermined serving portions which may be preferred by some.

During the operations of conveying and coating the articles 12 to provide coated articles 13, the desired coating material (such as chopped nutmeats, or small candies or candy particles) is supplied through hopper 30, which may be filled from time to time as needed. Hopper 30 has a relatively small opening at the bottom into feed tube 32 (FIGS. 2 and 3), containing a spiral-wire feed auger 31, which is revolved relatively slowly through adjustable-speed gear box 33, contained in housing 34. This coating material is carried into the entrance portion of the coating chamber 21 and allowed therein to fall by gravity.

As seen in FIGS. 2, 3, and 6, the cover member 21 of the coating chamber, which has the curved profile shown in FIGS. 4, 5, and 7, has partitions 23 and 24 which divide the coating chamber into an inner active coating portion 250 and relatively quiescent entrance and exit portions 251 and 252. Entrance and exit for the conveyed articles are provided through cover 21 at 27 and 28, and similar aligned openings are provided through partitions 23 and 24, the openings through partitions 23 and 24 extending to the bottom of the partitions within the lower housing member 22, to permit the cover 21 and its partitions 23 and 24 to be removed with the intermediate conveyor-track portion 7 in place.

The coating material supplied through tube 32, on falling into the lower portion of the coating-chamber structure, is acted upon by the two blower-impellers 25 and 26, seen best in end view in FIG. 7. These blower-impellers are rotated in opposite directions as shown by the arrows in FIG. 7 at about 1200 revolutions per minute, for example, giving a substantial peripheral velocity to each of the six illustrated vanes or paddles carried by each blower-impeller. Rather vigorous currents of air are thus carried up the opposite side walls of the coating chamber to meet and descend at the top of the chamber 250, and the coating material is also transmitted more or less entrained in the air currents, in addition to being somewhat directly moved by the blades of 25, 26. Due to the illustrated spacing apart of the blades, the currents of particles and air are of a pulsating and varying direction which has been found to provide a close approximation to perfect randomness of movement of the particles within inner chamber 250 to cause them to be moving an many directions incidental to securing a uniform coating of the articles being conveyed through the chamber. With the articles being conveyed through the chamber spaced substantially apart, no article being coated interferes materially with the coating of a preceding or succeeding article. Thus, the articles do not create mutual shadow effects. Accordingly, a large portion of the coating material particles being caused to fly hither and thither within inner chamber 250 does not strike an article being coated. For the most part, such non-striking particles descend along the sides of the conveyor section 7 and are again acted upon by the blower-impellers 25, 26, to thus be driven again and again through the coating chamber until any such particle strikes and adheres to an article undergoing coating.

As seen in FIGS. 2, 3, and 5 to 7, two air-jet tubes 53 and 54 extend into the coating apparatus from the left, being supplied with air under pressure through hoses 51 and 52. Jet tube 54 has jet openings 60 near the forward end thereof, each such jet opening being at a forward angle to give forwardly directing jets 62 as indicated in FIG. 3. These air jets have been found to assist in randomizing the directions of movement of coating particles, having particular reference to the lower portions of the articles 13 to cause them to be coated substantially as heavily as the more exposed upper portions of the articles. These jets appear to provide swirling eddies which act upon various zones of the traveling article undergoing coating as the movement of such article progresses.

Jet tube 53 has forwardly directed jet openings 59 located within the exit section 252 of the general coating chamber. Jet tube 53, which contains these openings, is located near the conveyor, as seen best in FIG. 7. Among other things, the forwardly directed jets 61 (FIG. 3) from these openings create currents laterally of the conveyor movement which dislodge coating particles which have fallen on the traveling web 9 (FIG. 1) of the conveyor, causing those particles to fall down within portion 252 within reach of the blower-impellers for a return trip through the coating chamber. The forward direction of jets 61 also causes a certain movement of air through the opening in partition member 24 into coating chamber 250, thus further assisting in the randomizing of the movement of coating particles within coating chamber 250.

Jet tubes 53 and 54 are fixed within adjustment brackets 55 and 56, which are slotted at the top to receive bolts passing through the side wall of cover 21 and are tightened in any desired position of rotational adjustment by wing nuts 57 and 58, whereby the described jets issuing from tubes 53 and 54 can be raised or lowered to reach a desired condition of balanced operation.

The larger cabinet section 2, as seen in FIGS. 2 and 4, contains an electric motor 41 for driving the conveyor apparatus and the moving structure in and associated with the coating chamber. The conveyor apparatus is driven from motor 41, through pulley 171, belt 170, reducing gear box 42, sprocket 166, chain 165 extending into smaller cabinet section 3, and sprocket 164 fixed with shaft 144 of conveyor-drive roller 143. A second sprocket 173 on shaft 144 drives take-up roll 147 through chain 163 and sprocket 153.

Referring to FIGS. 2 and 4, motor 41 drives the blower-impellers 25, 26 and gear box 33 associated with auger 31, through an inner groove of motor pulley 171, through belt 191, which travels in the direction indicated by the arrows in FIG. 4, over pulleys 192, 194, and 196. Pulleys 192 and 194 are reversely driven pulleys which respectively drive blower-impellers 25 and 26, pulley 196 being an idler pulley so located as to assist belt 191 in wrapping around the lower side of pulley 194, and also preferably adjustable for belt-tightening purposes. Pulleys 192 and 194 are attached respectively to shafts 193 and 195, through which the blower-impellers are driven. Shaft 193 carries an intermediately located pulley (see FIG. 2) which drives the gear box 33 for auger 31 through belt 223. As seen best in FIG. 3, the drive to gear box 33 is through a shaft to which pulley 219 is attached, and the drive through the gear box to the auger is through a laterally displaced shaft 221. A conventional arrangement may be employed within the gear box and controlled by lever 228, having shaft 229, which may be rotated to various positions of adjustment according to the speed at which the auger 31 is to be rotated. In the illustrative example, the auger may be driven at various speeds up to 300 revolutions a minute, with one position of lever 228 disconnecting the gears to stop the auger.

As shown in FIG. 2 for shaft 195, each of the shafts 193, 195 has a bearing structure 198 inside principal cabinet 2, and 198 may also contain a universal joint if desired, or other suitable arrangement providing a forward extension 195a of the shaft into operative engagement with the associated one of the two blower-impellers 25, 26. The short extension shaft 195a for impeller 26 is shown in FIG. 2 as provided with an encircling nut 209 which may be welded thereto to enable that shaft portion to be held by a wrench incidental to mounting blower-impeller 26 thereon. Referring to FIG. 6, the blower-impeller 26 may have a collar 202 secured thereto and internally threaded to receive the threaded end of extension shaft 195a, each of the parts being left-hand threaded to oppose the driven direction of the blower-impeller, the corresponding threading for item 25 being right-hand. The length of the threading is such that blower-impeller 26, for example, can be turned reversely when nut 209 is held to permit removal of the blower-impeller, when the upper housing 21 of the coating chamber is removed.

In FIG. 6, 200 indicates a bearing ring secured in the illustrated formed opening through the associated sloping end wall 204 of the lower closure 22 of the coating chamber.

Referring further to FIGS. 5 to 7, the lower housing 22 of the coating chamber has opposed end walls 204 which slope downwardly and inwardly toward the bottom to thus bring any coating material falling thereon within the influence of the blower-impellers. The side walls 205 of lower member 22 of the coating chamber merge along a curved line with the bottom of the structure, which curves upwardly to an elevated central portion 233, thus giving each of the blower-impellers 25 and 26 about 180° of close confinement incident to their described action. Coating material may thus be picked up through any part of a considerable sweep of the blower-impeller blades along the bottom of the chamber. The disclosed structure avoids leaving any substantial pockets wherein coating material may accumulate during operation.

FIG. 8 shows the slipping-clutch arrangement by which take-up roller 147, having shaft 148, is driven. Shaft 148 is received within sleeve 161 which extends through and is welded to front wall member 70 of cabinet section 3, or to a structural plate underlying that wall portion if desired. A suitable bearing for shaft 148 is provided by bushings 160 and 162. Sprocket wheel 153, driven by chain 163 of FIGS. 2 and 5, is free to turn on shaft 148 except for a thrust engagement of sprocket 153 with washer-like member 152 keyed to shaft 148. The thrust engagement between parts 152 and 153 is provided by spring 157, compressed as desired by nut 159, and thrusting inwardly through washer-like members 154 and 156 which are free to turn on the shaft except as held by friction. Ball bearings 155 are secured in a suitable annular ball race between parts 154 and 156 to permit part 156 to be held stationary with respect to spring 157 while permitting member 154 to turn because of its frictional engagement with 153. When a new take-up roll 11 (FIG. 1) is first started on take-up roller 147, the take-up roller turns with sprocket 153. However, when the diameter of the take-up roll increases as more of the used web 9 is rolled thereon, slippage occurs between members 152 and 153 to reduce the angular velocity of shaft 148 and take-up roller 147 as required to enable the take-up roller to receive the used web as it is driven by drive roller 143, as explained in connection with FIG. 1. The frictional engagement between parts 152 and 153 should be sufficient to insure that the take-up roll has sufficient tension to accomplish its take-up purpose, but the force applied by the take-up roller should be insufficient to break the web 9 and insufficient to cause the web 9 to slip between rollers 143 and 145. Thereby an undesired increase in the speed of travel of the conveyor web as the take-up roll enlarges is avoided.

When desired, drive sprocket 153 may be made rigid with shaft 148, in which case a sleeve (not shown, as of cardboard which fits comparatively snugly) may be placed over take-up roller 147 on which to start the take-up roll, and reliance is had on the slippage between the noted sleeve and the take-up roller for the described purpose.

Motor 41, in addition to driving apparatus as described through the belts on its double-grooved pulley 171, is directly connected at the other end to air compressor 43. This compressor supplies compressed air, through conventional tubing, not shown, to air hoses 51 and 52 for the described coating-chamber air jets, and also supplies compressed air through heater C21 of FIG. 3, and thence by way of tube C22 which is employed as warmed or heated compressed air in connection with the Former F of FIG. 1 as described in our previously noted application filed herewith.

As a convenience in packing and shipping, the receiving portion 6 of the conveyor is hinged at 97, 98 to permit it to be dropped to a position close to the cabinet structure when bolt 95 is removed and when bolt 96 is removed to permit removal of arms 91 and 92 for compact packing.

For a similar purpose, discharge end 8 of the conveyor may be removed from the cabinet structure by unbolting, as indicated best in FIG. 3, enabling member 8 and the attached slide member 19 to be removed and suitably placed within the shipping package.

The upper enclosure 21 for the coating chamber may be made of a heavy transparent plastic material to permit the operation within the coating chamber to be readily observed. Conveniently, partition members 23 and 24, which are fixed with housing 21, may be formed of the same plastic material.

When it is desired to use the conveyor of the coating apparatus to convey uncoated articles 12 to the prepackaging location indicated at 300 (FIG. 1), the coating operation may be withheld merely by withholding coating material from the coating chamber as by setting the handle 228 to its zero-drive position to stop the auger 27 and removing all coating material that may be present within the coating chamber. If desired, the blower-impellers 25 and 26 may each be removed by threading them off their drive shafts with the upper housing of the coating chamber removed, and the flow of air through the described jets by way of tubes 51 and 52 may be discontinued by closing a suitable valve, not shown.

As an alternative to removing the blower-impellers 25 and 26, belt 191 (FIG. 4) may be removed to stop the drive to the blower-impellers.

The described constructional features permit the apparatus to be readily maintained in a clean and sanitary condition for the described processing of food products. With web 9 removed, the exposed portions of the conveyor may be cleaned in the customary manner, keeping in mind that the conveyed articles contact only the moving web of the conveyor.

When the upper portion 21 of the coating chamber is removed, the entire coating chamber is exposed for such cleaning as may be desired. The blower-impellers may be detached as described, as for washing and sterilizing, leaving the inside of the lower portion 22 of the coating chamber completely accessible for such sanitation procedure as may be desired or may be prescribed by health authorities.

When the coating particles to be used are of such nature (small chocolate candies or candy particles, for example), that when warm they may tend to coalesce or to adhere to smooth surfaces under the described action within the coating chamber, such material may be kept refrigerated until poured into the food hopper 30, which usually suffices to maintain the particles in a sufficiently chilled condition until they are applied as described to the articles being coated. When the articles undergoing coating are the noted frozen dessert articles (as of molded ice cream), they themselves tend to refrigerate the coating chamber. When desired, the operation of the described apparatus may be carried out within a controlled-temperature room, or local refrigeration may be applied to the coating apparatus in any suitable or desired manner.

Referring again to FIGS. 3, 6, and 7, the intermediate section 7 of the conveyor track, instead of having a flat imperforate surface as indicated for the remaining portion of the conveyor track, is composed of a number of parallel rods 7′ which may be of circular profile, as indicated in section in FIG. 7. Conveyor web 9 is thus supported for a substantial distance, including the entire distance through the coating chamber, on a number of parallel downwardly sloping surfaces afforded by the parallel rods 7′. In addition to offering less friction over the concerned portion of the trackway, the rods 7′ afford no lodging place between the web 9 and the trackway rods 7′ for coating particles to lodge within the coating chamber. On the other hand, when a flat imperforate support bed for the traveling web 9 is provided through the coating chamber, any slight curling or vibration of the edge portions of the conveyor web 9 permits coating particles to be driven beneath the conveyor web to lodge between it and the trackway, resulting in those coating particles being carried forward to some extent underneath the web to cause difficulty where the web 9 passes over rollers 16. In practice, it is found that this difficulty is eliminated by the disclosed longitudinally perforate and rounded construction 7′.

While we have described above the principles of our invention in connection with specific apparatus, it is to be clearly understood that this description is made only by way of example and not as a limitation to the scope of our invention.

We claim:

1. An apparatus for coating an article of food on substantially all the exposed surfaces thereof with other food particles, said apparatus comprising a substantially closed coating chamber, conveying means extending through said coating chamber and spaced from the sides thereof and for carrying said food article therethrough, an impeller within said chamber for creating an air stream, said impeller situated within said chamber below said conveying means, and means for introducing said food particles into said chamber adjacent said impeller, whereby said food particles are mixed with said air stream, and said air stream mixed with said food particles is directed upwardly above and to one side of said conveying means and then transversely across the top of the conveying means, whereby said particles descend by gravity to coat said article of food carried by the conveying means.

2. An apparatus as recited in claim 1, and comprising a second chamber adjacent said coating chamber, said conveying means extending from the coating chamber through said second chamber for carrying said coated article through the second chamber after passage through the coating chamber, means for containing said air stream in said coating chamber, whereby said second chamber is substantially quiescent, air supply means, and means in said second chamber for directing an air jet from said air supply means against said conveying means to remove therefrom food particles remaining thereon after passage through said coating chamber, whereby said removed food particles are returned to the bottom of said coating chamber adjacent said impeller, and said returned food particles are re-mixed with said air stream.

3. An apparatus as recited in claim 1, and comprising air supply means, and means adjacent said conveying means for directing an air jet from said air supply means transversely to the direction of descent of said food particles, whereby swirling eddies are created adjacent said conveying means to assist in coating the lower portion of said article of food.

4. An apparatus as recited in claim 1, and comprising another chamber adjacent said coating chamber, said conveying means extending through said other chamber and then into said coating chamber, and means for containing said air stream in said coating chamber whereby the other chamber is substantially quiescent.

5. An apparatus for coating an article of food on substantially all the exposed surfaces thereof with other food particles, said apparatus comprising a substantially closed coating chamber, conveying means extending through said chamber and spaced from the sides thereof and for carrying said food articles therethrough, impelling means within said chamber for creating a pair of air streams and situated within said chamber below said conveying means, means for introducing said food particles into said chamber adjacent said impelling means, whereby said food particles are mixed with said air streams, and each of said air streams mixed with said food particles is directed upwardly past a respective one of the opposite sides of the conveying means and then transversely towards each other across the top of said conveying means to create a turbulence from which the food particles descend by gravity to coat said article of food carried by the conveying means.

6. An apparatus as recited in claim 5 and comprising air supply means, and means adjacent said conveying means for directing an air jet from said air supply means transversely to the direction of descent of said food particles, whereby swirling eddies are created adjacent said conveying means to assist in coating the lower portions of said article of food.

7. An apparatus as recited in claim 5 wherein said impelling means comprises a pair of impellers each extending axially in the same direction as the conveying means extends and each situated below and on opposite sides of the conveying means, and means for rotating each of said impellers in an opposite sense.

8. A method of coating an article of food with other food particles, said method comprising the steps of conveying said article of food along a path extending through a coating chamber, mixing said other food particles with a pair of air streams within said chamber and below said path, directing each of said air streams mixed with said food particles upwardly and to respective opposite sides of said path within said chamber, and then directing each of said air streams towards each other within said chamber to a create a turbulence over said article of food as the latter moves along the path, said food particles descending through said turbulence by gravity to coat the article of food.

9. A method as recited in claim 8 and comprising the additional step of directing a jet of air across said path transversely to the direction of descent of said food particles, whereby swirling eddies are created to assist in coating the lower portions of said article of food.

References Cited in the file of this patent

UNITED STATES PATENTS

| | | |
|---|---|---|
| 1,444,119 | Hedlund et al. | Feb. 6, 1923 |
| 1,582,411 | Lesser et al. | Apr. 27, 1926 |
| 1,673,686 | Kremmling | June 12, 1928 |
| 1,810,862 | Vogt | June 16, 1931 |
| 2,173,032 | Wintermute | Sept. 12, 1939 |
| 2,573,835 | Dyar | Nov. 6, 1951 |
| 2,666,410 | Budny | Jan. 19, 1954 |
| 2,689,544 | Habgood | Sept. 21, 1954 |
| 2,710,588 | Parry et al. | June 14, 1955 |
| 2,735,378 | Vogt | Feb. 21, 1956 |
| 2,799,242 | Cain | July 16, 1957 |
| 2,855,893 | Greer et al. | Oct. 14, 1958 |

FOREIGN PATENTS

| | | |
|---|---|---|
| 391,121 | Great Britain | Apr. 18, 1933 |